United States Patent
Hirai et al.

(10) Patent No.: US 8,018,516 B2
(45) Date of Patent: Sep. 13, 2011

(54) SOLID-STATE IMAGE SENSOR AND SIGNAL PROCESSING METHOD OF SAME

(75) Inventors: Jun Hirai, Nara (JP); Ichiroh Murakami, Kyoto (JP); Masanori Murakami, legal representative, Shizuoka (JP)

(73) Assignee: Panasonic Corporation, Osaka (JP)

( * ) Notice: Subject to any disclaimer, the term of this patent is extended or adjusted under 35 U.S.C. 154(b) by 369 days.

(21) Appl. No.: 12/429,070

(22) Filed: Apr. 23, 2009

(65) Prior Publication Data

US 2009/0309999 A1 Dec. 17, 2009

(30) Foreign Application Priority Data

Jun. 16, 2008 (JP) ................................. 2008-156873

(51) Int. Cl.
*H04N 5/335* (2011.01)

(52) U.S. Cl. ....................................... 348/308; 348/315

(58) Field of Classification Search .................. 348/308, 348/315, 222.1, 229.1, 297, 300, 301; 257/290, 257/291; 250/208.1
See application file for complete search history.

(56) References Cited

U.S. PATENT DOCUMENTS

| 6,646,246 | B1 | 11/2003 | Gindele et al. | |
|---|---|---|---|---|
| 7,223,955 | B2 | 5/2007 | Suzuki | |
| 2002/0027189 | A1 | 3/2002 | Murakami et al. | |
| 2005/0231606 | A1 | 10/2005 | Suzuki | |
| 2006/0012698 | A1* | 1/2006 | Nitta et al. | 348/308 |
| 2009/0244346 | A1* | 10/2009 | Funaki | 348/308 |

FOREIGN PATENT DOCUMENTS

| JP | 03-117281 | 5/1991 |
|---|---|---|
| JP | 11-234575 | 8/1999 |

* cited by examiner

*Primary Examiner* — Hung Dang
(74) *Attorney, Agent, or Firm* — McDermott Will & Emery LLP

(57) ABSTRACT

A signal processing method of a solid-state image sensor includes comparing a high-sensitivity-pixel output signal and a first threshold value to determine whether or not the high-sensitivity-pixel output signal reaches a level of a saturated-high-sensitivity-pixel output signal. If the high-sensitivity-pixel output signal does not reach the level of the saturated-high-sensitivity-pixel output signal, a difference value between the high-sensitivity-pixel output signal and an amplified low-sensitivity-pixel output signal is calculated. The amplified low-sensitivity-pixel output signal is obtained by multiplying a low-sensitivity-pixel output signal by a sensitivity ratio, which is obtained by dividing a sensitivity value of a high sensitivity pixel by a sensitivity value of a low sensitivity pixel. A first or second image signal is output according to whether an absolute value of the difference value is smaller than a second threshold value or not.

12 Claims, 7 Drawing Sheets

SOLID-STATE IMAGE SENSOR AND SIGNAL PROCESSING METHOD OF SAME

CROSS-REFERENCE TO RELATED APPLICATIONS

This application claims priority from Japanese Patent Application No. 2008-156873 filed on Jun. 16, 2008, which is hereby incorporated by reference in its entirety for all purposes.

BACKGROUND

The present disclosure relates to a solid-state image sensor and a signal processing method of the same, specifically a solid-state image sensor having a structure which enables a wide optical dynamic range and which is capable of reducing artifacts caused by color mixture, and a signal processing method of the same.

In typical solid-state image sensors, light from an object that is incident on a plurality of pixels arranged in a matrix is converted into signal charge to be accumulated in a photodiode included in each pixel. Once the signal charge spills over the photodiode, signals output according to the signal charge become constant. Thus, once the amount of light coming into a photodiode exceeds the saturation level of the photodiode, it is impossible to resolve the brightness of the optical wavelength band of the incoming light. Pixel size is particularly reduced in recent solid-state image sensors to reduce chip size and increase the number of pixels, and the size of a photodiode is thus reduced, too. This leads to a reduction in an optical dynamic range.

To increase the dynamic range, the following technique has been used.

Figure 6:
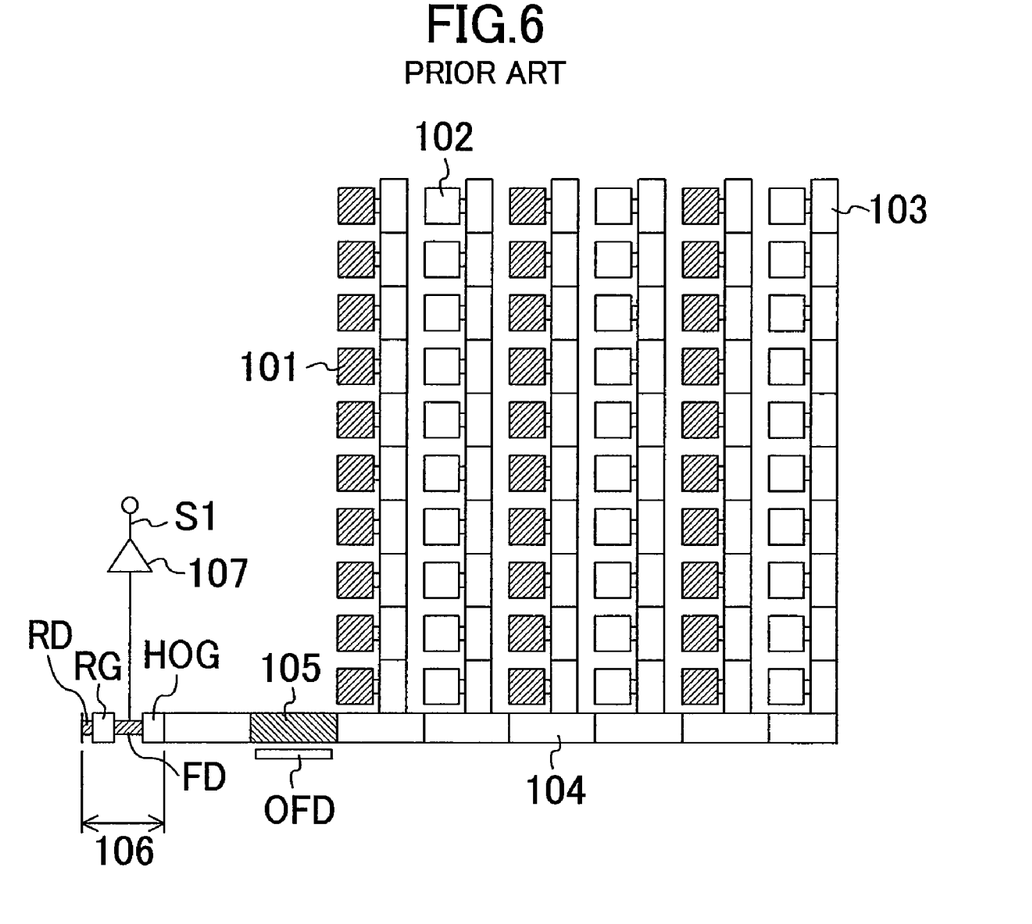
FIG. 6 illustrates a pixel arrangement of a conventional solid-state image sensor.

FIG. 6 illustrates a plan view of an example structure of a conventional solid-state image sensor.

According to the conventional solid-state image sensor of FIG. 6, two types of pixels having different sensitivities, for example, a high sensitivity pixel 101 and a low sensitivity pixel 102, are alternately arranged in a row direction. Signal charge generated by photoelectric conversion in the two types of pixels is transferred to a vertical transfer register 103 and then a horizontal transfer register 104. The signal charge received in the horizontal transfer register 104 is further transferred from an upper horizontal transfer electrode 105 and a transfer section including an overflow drain (OFD) for charge clip, to a charge detection section 106 (an output gate electrode HOG, a floating diffusion FD, a reset gate RG, and a reset drain RD) and an amplifier section 107 to be converted into signals as voltage and output as an image signal S1 (see, for example, Japanese Laid-Open Patent Application Publication No. 11-234575).

Figure 7:
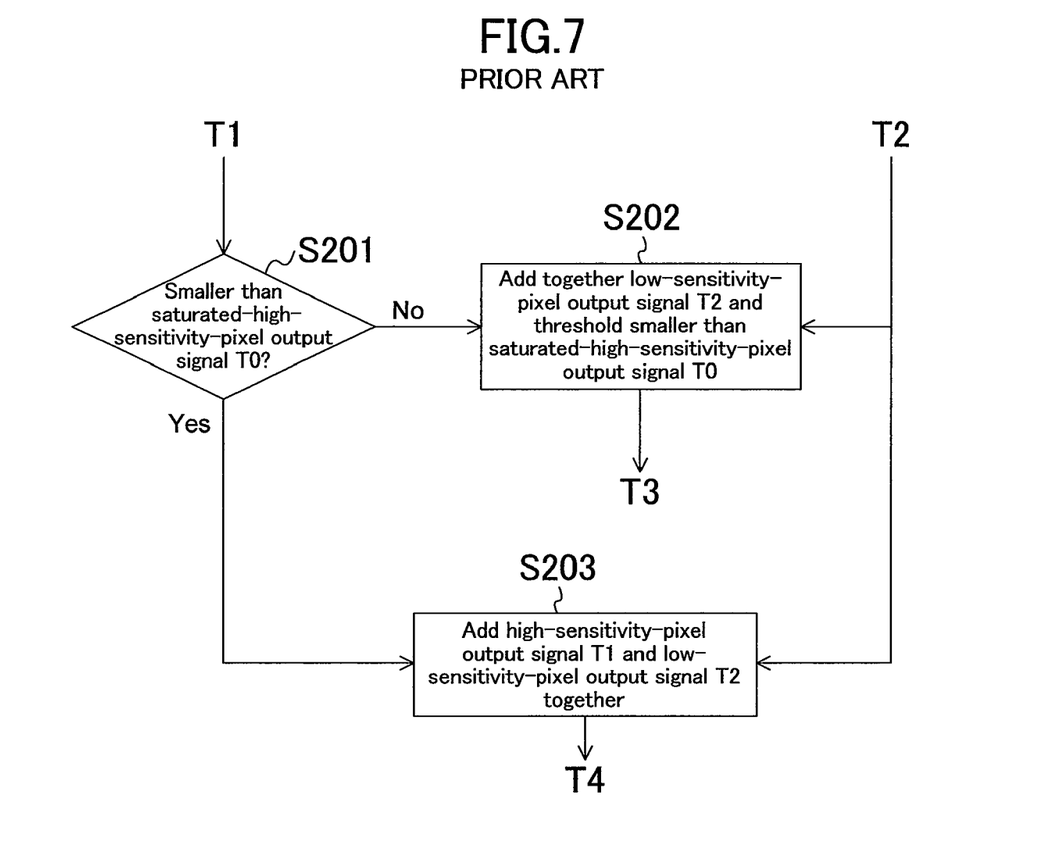
FIG. 7 illustrates a flowchart of a signal processing method of a conventional solid-state image sensor.

FIG. 7 is a flowchart of signal processing of the conventional solid-state image sensor.

In the conventional solid-state image sensor of FIG. 6, a decision circuit (not shown) determines at S201 whether or not a high-sensitivity-pixel output signal T1 (a signal output from the high sensitivity pixel 101) is saturated, as illustrated in FIG. 7. Specifically, the decision circuit receives the high-sensitivity-pixel output signal T1 and determines whether or not the signal T1 is smaller than a saturated-high-sensitivity-pixel output signal T0 (a signal output from the saturated high sensitivity pixel 101). If the signal T1 is greater than the signal T0 ("No" at S201), in other words, if the signal T1 is saturated, the processing goes to S202. At S202, an adder circuit (not shown) adds together a low-sensitivity-pixel output signal T2 (a signal output from the low sensitivity pixel 102) and a threshold value that is smaller than the signal T1 to generate and output a pixel signal T3. On the other hand, if the signal T1 is smaller than the signal T0 ("Yes" at S201), in other words, if the signal T1 is not saturated, the processing goes to S203. At S203, an adder circuit (not shown) adds the signal T1 and the signal T2 together to generate and output a pixel signal T4.

As explained in the above, the signal processing method of the conventional solid-state image sensor can achieve a wide dynamic range even in the case where the signal charge of the high sensitivity pixel 101 is saturated.

The common techniques for forming the two types of pixels having different sensitivities in the conventional solid-state image sensor include, for example, making pixels arranged next to each other have photodiodes different in size, and making shielding films formed above photodiodes have different aperture sizes.

SUMMARY

In solid-state image sensors, as a result of reduction in pixel size, it is recently becoming difficult to provide sufficient space for an isolation area (ineffective area) between adjacent pixels. It is accordingly becoming difficult to suppress color mixture caused by signal charge spilling from an adjacent pixel, in particular from a pixel provided with a red filter in the upper portion of the pixel.

Specifically, if a high sensitivity pixel in conventional techniques is formed by making its photodiode have a wide aperture area and/or have a wide charge accumulation area, it reduces the space for the isolation area between the adjacent pixels. As a result, color mixture is apt to occur.

However, if the space for the isolation area around a high sensitivity pixel is increased to avoid color mixture, it in turn reduces a maximum amount of charge accumulation in the high sensitivity pixel. As a result, the range of brightness which the pixel resolving high-brightness light can resolve is reduced, and overall dynamic range is accordingly decreased.

Moreover, according to the signal processing method of the above conventional solid-state image sensor, the high sensitivity pixel is used for a low-brightness incoming light, and the low sensitivity pixel is used for a high-brightness incoming light. In other words, the signal charge accumulated in the high sensitivity pixel and the low sensitivity pixel is selectively used according to the brightness, high or low, of incoming light. This means that the signal charge is not efficiently used in the above conventional solid-state image sensor. Color mixture caused by artifacts included in a high-sensitivity-pixel output signal becomes noticeable, particularly in the case where an image signal is generated by simply adding together the high-sensitivity-pixel output signal and a low-sensitivity-pixel output signal when the signal charge accumulated in the high sensitivity pixel is not saturated. Hence, the pixel arrangement of the conventional solid-state image sensor is very inefficient under current circumstances where a pixel size is reduced to 2.0 μm or less and it is becoming difficult to ensure a sufficiently-high maximum amount of charge accumulation, which is an important factor for achieving both the high resolution and good color reproduction of brightness. Thus, the conventional solid-state image sensor cannot attain good color reproduction if the pixel size is not large enough to ensure a sufficiently-high maximum amount of charge accumulation.

In view of the above, a solid-state image sensor of the present invention and a signal processing method of the same may be advantageous in achieving a wide dynamic range, suppression of color mixture and high-quality color reproduction, independently of each other.

To realize the above, the present invention provides a signal processing method for a solid-state image sensor in which a high sensitivity pixel whose sensitivity to brightness is high and a low sensitivity pixel whose sensitivity to brightness is low are arranged according to a given pixel pattern and multiple ones of given pixel pattern are arranged in a matrix, and in which each signal charge accumulated in the high sensitivity pixel and the low sensitivity pixel due to light from an object is converted into an electric signal and from which the electric signal is output, the method including: (a) comparing a first threshold value and a high-sensitivity-pixel output signal, which is an electric signal converted from a signal charge accumulated in the high sensitivity pixel, thereby determining whether or not the high-sensitivity-pixel output signal reaches a level of a saturated-high-sensitivity-pixel output signal, which is the high-sensitivity-pixel output signal when the signal charge accumulated in the high sensitivity pixel is saturated; (b) if the high-sensitivity-pixel output signal does not reach the level of the saturated-high-sensitivity-pixel output signal at (a), calculating a difference value between the high-sensitivity-pixel output signal and an amplified low-sensitivity-pixel output signal obtained by multiplying a low-sensitivity-pixel output signal by a sensitivity ratio, the low-sensitivity-pixel output signal being an electric signal converted from a signal charge accumulated in the low sensitivity pixel, and the sensitivity ratio being obtained by dividing a sensitivity value of the high sensitivity pixel by a sensitivity value of the low sensitivity pixel; and (c) outputting one of a first image signal and a second image signal which are different from each other, according to whether or not an absolute value of the difference value at (b) is smaller than a second threshold value.

In the above signal processing method, (c) may includes: if the absolute value of the difference value at (b) is smaller than the second threshold value, adding the high-sensitivity-pixel output signal and the low-sensitivity-pixel output signal together and outputting a resultant signal as the first image signal; and if the absolute value of the difference value at (b) is equal to or greater than the second threshold value, adding the amplified low-sensitivity-pixel output signal and the low-sensitivity-pixel output signal together and outputting a resultant signal as the second image signal.

The above signal processing method may further includes (d) if the high-sensitivity-pixel output signal reaches the level of the saturated-high-sensitivity-pixel output signal at (a), outputting the saturated-high-sensitivity-pixel output signal or the first threshold value as a third image signal.

In the above signal processing method, (d) may include adding together the amplified low-sensitivity-pixel output signal and one of the saturated-high-sensitivity-pixel output signal and the first threshold value and outputting a resultant signal as the third image signal.

In the above signal processing method, the high sensitivity pixel may have a light-receiving surface which is larger than a light-receiving surface of the low sensitivity pixel.

In the above signal processing method, the high and low sensitivity pixels have high and low sensitivities to a first optical wavelength band; the solid-state image sensor may further include (1) a first medium sensitivity pixel having a medium sensitivity between the sensitivity of the high sensitivity pixel and the sensitivity of the low sensitivity pixel to a second optical wavelength band which is different from the first optical wavelength band and (2) a second medium sensitivity pixel having a medium sensitivity between the sensitivity of the high sensitivity pixel and the sensitivity of the low sensitivity pixel to a third optical wavelength band which is different from the first optical wavelength band; and the high sensitivity pixel, the low sensitivity pixel, the first medium sensitivity pixel, and the second medium sensitivity pixel may be arranged according to the given pixel pattern and multiple ones of given pixel pattern may be arranged in a matrix.

In the above signal processing method, the first optical wavelength band may include a wavelength to which the human eye is most sensitive.

In the above signal processing method, the first optical wavelength band may correspond to green.

In the above signal processing method, one of the second and third optical wavelength bands may include a wavelength or absorption length which is longer than a wavelength or absorption length of the first optical wavelength band.

In the above signal processing method, the second threshold value may be a multiple value of an amount of random noise in the low sensitivity pixel, the multiple value being larger than 1.

In addition, the present invention provides a solid-state image sensor in which a high sensitivity pixel whose sensitivity to brightness is high and a low sensitivity pixel whose sensitivity to brightness is low are arranged according to a given pixel pattern and multiple ones of given pixel pattern are arranged in a matrix, and in which each signal charge accumulated in the high sensitivity pixel and the low sensitivity pixel due to light from an object is converted into an electric signal and from which the electric signal is output, the solid-state image sensor including: a first decision circuit for comparing a first threshold value and a high-sensitivity-pixel output signal, which is an electric signal converted from a signal charge accumulated in the high sensitivity pixel, thereby determining whether or not the high-sensitivity-pixel output signal reaches a level of a saturated-high-sensitivity-pixel output signal, which is the high-sensitivity-pixel output signal when the signal charge accumulated in the high sensitivity pixel is saturated; a difference circuit for calculating, if the first decision circuit determines that the high-sensitivity-pixel output signal does not reach the level of the saturated-high-sensitivity-pixel output signal, a difference value between the high-sensitivity-pixel output signal and an amplified low-sensitivity-pixel output signal obtained by multiplying a low-sensitivity-pixel output signal by a sensitivity ratio, the low-sensitivity-pixel output signal being an electric signal converted from a signal charge accumulated in the low sensitivity pixel, and the sensitivity ratio being obtained by dividing a sensitivity value of the high sensitivity pixel by a sensitivity value of the low sensitivity pixel; a second decision circuit for determining whether or not an absolute value of the difference value calculated by the difference circuit is smaller than a second threshold value; and an adder circuit for outputting one of a first image signal and a second image signal which are different from each other, according to a decision of the second decision circuit.

In the above solid-state image sensor, the adder circuit may include: a first adder circuit for adding the high-sensitivity-pixel output signal and the low-sensitivity-pixel output signal together and outputting a resultant signal as the first image signal, if the absolute value of the difference value calculated by the difference circuit is smaller than the second threshold value; and a second adder circuit for adding the amplified low-sensitivity-pixel output signal and the low-sensitivity-pixel output signal together and outputting a resultant signal as the second image signal, if the absolute value of the difference value calculated by the difference circuit is equal to or greater than the second threshold value.

According to the above solid-state image sensor and the signal processing method of the same, it is possible to achieve a wide dynamic range, suppression of color mixture and high-quality color reproduction, independently of each other.

DETAILED DESCRIPTION

A solid-state image sensor according to an example embodiment of the present invention and a signal processing method of the same are hereinafter described, with reference made to FIG. 1 to FIG. 3.

Figure 1:
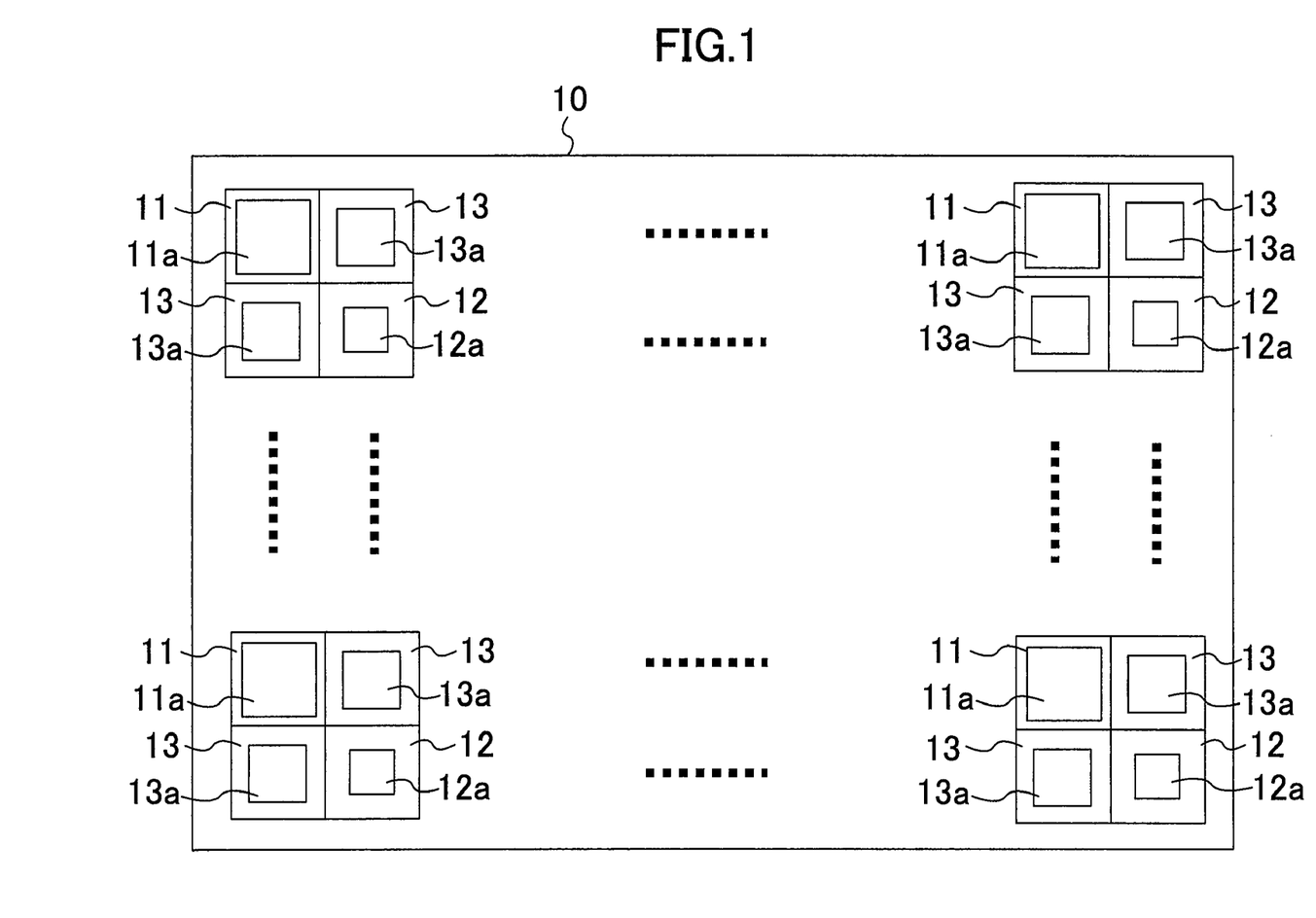
FIG. 1 illustrates a pixel arrangement of a solid-state image sensor according to an example embodiment of the present invention.

FIG. 1 illustrates a pixel arrangement of a solid-state image sensor 10 according to an example embodiment of the present invention.

As shown in FIG. 1, a high sensitivity pixel 11 whose sensitivity to brightness is high (sensitivity to a first optical wavelength band is high) and a low sensitivity pixel 12 whose sensitivity to brightness is low (sensitivity to the first optical wavelength band is low) are arranged according to a given pixel pattern, and multiple ones of given pixel pattern are arranged in a matrix. The high sensitivity pixel 11 and the low sensitivity pixel 12 include a high sensitivity photodiode 11a and a low sensitivity photodiode 12a, respectively. The high sensitivity photodiode 11a has, for example, a wide light-receiving surface and the low sensitivity photodiode 12a has, for example, a light-receiving surface smaller than the light-receiving surface of the high sensitivity photodiode 11a. This is realized by, for example, making shielding films have different aperture sizes. Herein, the ratio between the sensitivity of the high sensitivity pixel 11 and the sensitivity of the low sensitivity pixel 12 is such that a sensitivity value of the high sensitivity pixel 11 is 2 to 5 when a sensitivity value of the low sensitivity pixel 12 is 1 (one). FIG. 1 is an example pixel arrangement in which color filters are arranged in Bayer matrix. The high sensitivity pixel 11 and the low sensitivity pixel 12 are G (green) pixels. One of two pixels 13, each including a photodiode 13a, is an R (red) pixel (a pixel having a medium sensitivity between the sensitivity of the high sensitivity pixel 11 and the sensitivity of the low sensitivity pixel 12 to a second optical wavelength band which is different from the first optical wavelength band) and the other is a B (blue) pixel (a pixel having a medium sensitivity between the sensitivity of the high sensitivity pixel 11 and the sensitivity of the low sensitivity pixel 12 to a third optical wavelength band which is different from the first optical wavelength band). However, the present invention is not limited to this example. In the case of Bayer matrix as mentioned in the above, the pixel pattern may be that the two G pixels serve as high and low sensitivity pixels, respectively, or that each of the RGB pixels includes high and low sensitivity pixels.

Although FIG. 1 does not illustrate some of the structural elements of the conventional solid-state image sensor of FIG. 6, such as a vertical transfer register, a horizontal transfer register, and a charge detection section, the present invention may include structural elements similar to those of FIG. 6 or may include other structural elements. The solid-state image sensor 10 of the present invention is thus applicable to CCD solid-state image sensors and MOS solid-state image sensors, and further applicable to back-illuminated image sensors as well.

Next, a signal processing method of the solid-state image sensor 10 according to an example embodiment of the present invention is described.

Figure 2:
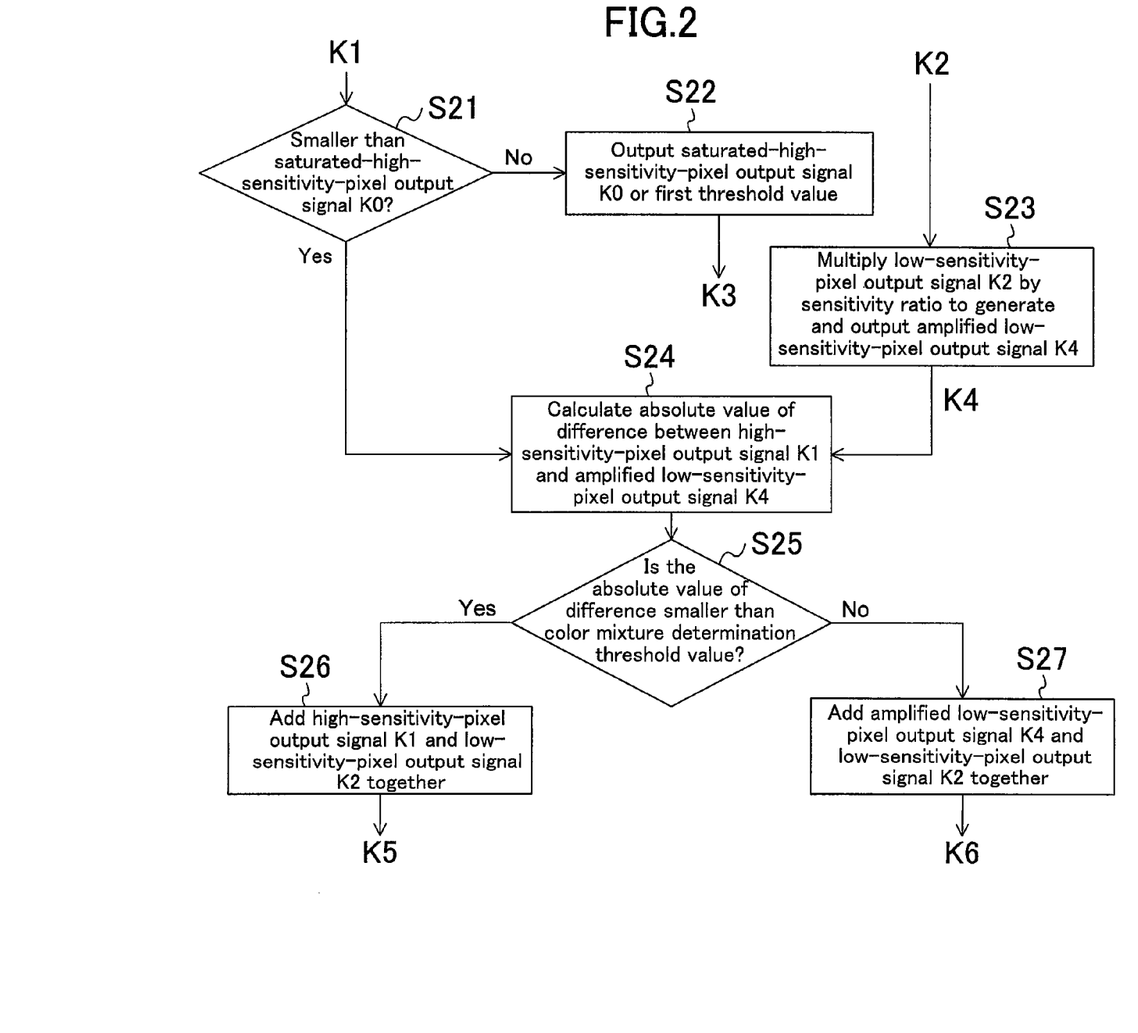
FIG. 2 illustrates a flowchart of a signal processing method of a solid-state image sensor according to an example embodiment of the present invention.

FIG. 2 illustrates a flowchart of a signal processing method of the solid-state image sensor 10 according to an example embodiment of the present invention. FIG. 3 illustrates a block diagram showing a circuit configuration of the solid-state image sensor 10 that is necessary for realizing the signal processing method of the present embodiment shown in FIG. 2.

Figure 3:
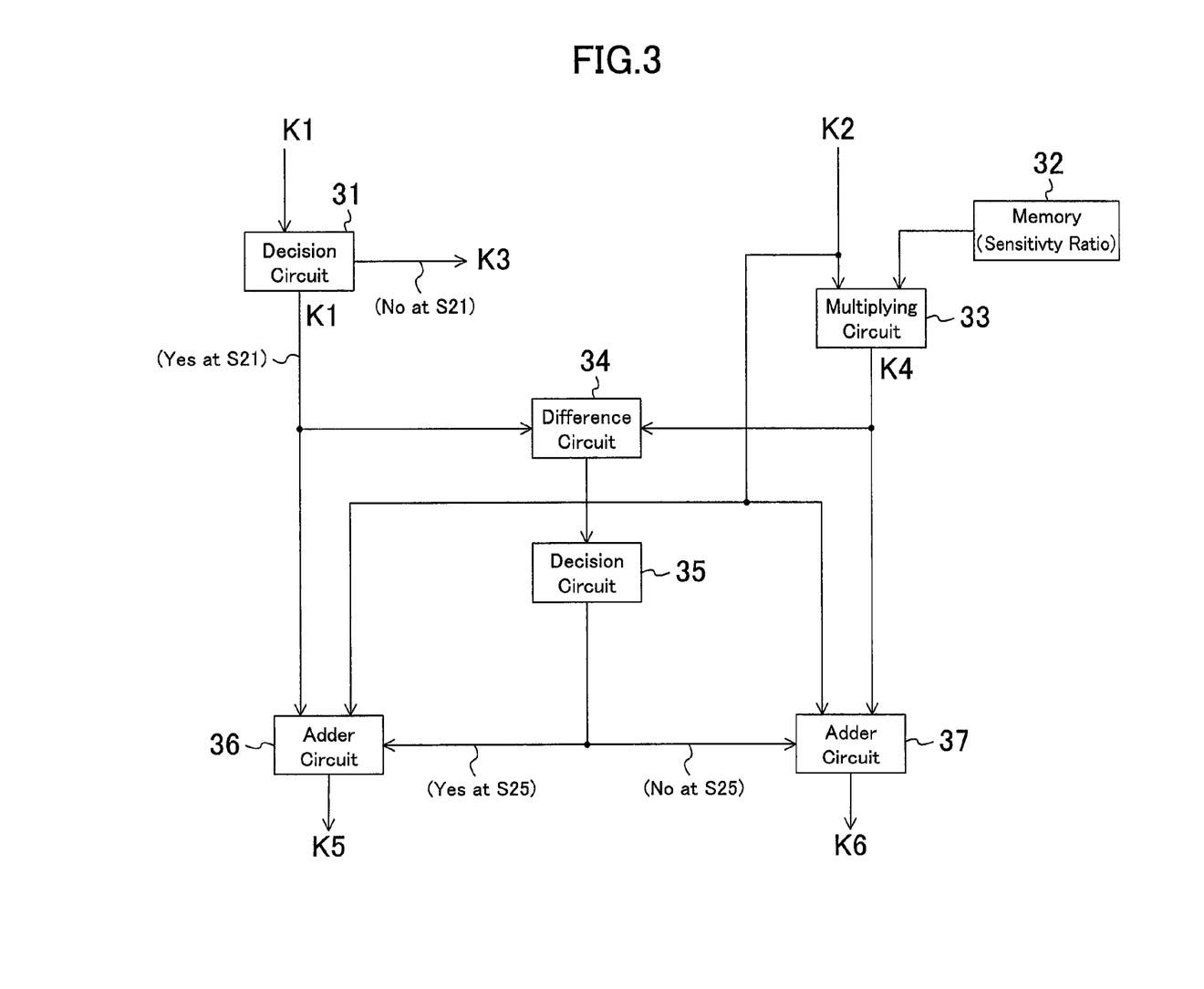
FIG. 3 illustrates a block diagram showing a circuit configuration of signal processing of a solid-state image sensor according to an example embodiment of the present invention.

Light from an object that is incident on the high sensitivity pixel 11 and the low sensitivity pixel 12 is accumulated as signal charge in the photodiode 11a and the photodiode 12a, respectively, and the signal charge is converted into electric signals to be output from the solid-state image sensor 10 as a high-sensitivity-pixel output signal K1 and a low-sensitivity-pixel output signal K2, respectively, as shown in FIG. 2 and FIG. 3.

At S21, a decision circuit 31 (first decision circuit) compares the high-sensitivity-pixel output signal K1 and a first threshold value to determine whether or not the high-sensitivity-pixel output signal K1 is smaller than a saturated-high-sensitivity-pixel output signal K0 (a signal output from a saturated high sensitivity pixel 11), thereby determining whether or not the high-sensitivity-pixel output signal K1 is saturated. If the signal K1 is equal to or greater than the signal K0 ("No" at S21), in other words, if the signal K1 is saturated, the processing goes to S22. At S22, the signal K0 or the first threshold value is output as an image signal K3 (third image signal). In the case where the signal K0 is output as the image signal K3 at S22, the signal K3 continues to increase gradually according to an increase of the brightness of light, even after the saturation of the signal K0. In this case, however, variations in saturation between pixels may be generated if the amount of charge at which a pixel is saturated differs between pixels. On the other hand, in the case where a constant value is output as the first threshold value at S22, variations in saturation between pixels can be suppressed, but in turn, resolution of high-brightness light will be limited.

If the signal K1 is smaller than the signal K0 ("Yes" at S21), in other words, if the signal K1 is not saturated, the processing goes to S24.

At S24, a difference circuit 34 calculates the absolute value of a difference between the signal K1 and an amplified low-sensitivity-pixel output signal K4, and the processing goes to S25. Herein, the amplified low-sensitivity-pixel output signal K4 of S24 can be obtained at S23. Specifically, at S23, a multiplying circuit 33 receives the low-sensitivity-pixel output signal K2 and multiplies the signal K2 by a sensitivity ratio stored in a memory 32 to generate and output the amplified low-sensitivity-pixel output signal K4. The sensitivity ratio is obtained by dividing a sensitivity value of the high sensitivity pixel 11 by a sensitivity value of the low sensitivity pixel 12.

At S25, a decision circuit 35 (second decision circuit) determines whether or not the absolute value of the difference obtained by the difference circuit 34 is smaller than a second threshold value (color mixture determination threshold value) for determining the amount of artifacts caused by color mixture. Herein, it is preferable that the second threshold value is set to a multiple value of the amount of random noise in the low sensitivity pixel 12, the multiple value being larger than 1 (one). The second threshold value may also be adjustable by an external operation according to the circumstances where images are picked up. If the decision circuit 35 determines that the absolute value of the difference is smaller than the second threshold value ("Yes" at S25), it is decided that there is a small amount of artifacts caused by color mixture due to light having a long optical wavelength or absorption length and leaking into the high sensitivity pixel 11 from an adjacent pixel 13 (R pixel, for example) on which the light is incident. In this case, the processing goes to S26. On the other hand, if decision circuit 35 determines that the absolute value of the difference is equal to or greater than the second threshold value ("No" at S25), it is decided that the amount of artifacts caused by the above color mixture is large, and the processing goes to S27.

If S25 is followed by S26, an adder circuit 36 (first adder circuit) receives from the decision circuit 35 a signal indicating that the absolute value of the difference is smaller than the second threshold value. The adder circuit 36 then adds the high-sensitivity-pixel output signal K1 and the low-sensitivity-pixel output signal K2 together to generate and output an image signal K5 (first image signal). On the other hand, if S25 is followed by S27, an adder circuit 37 (second adder circuit) receives from the decision circuit 35 a signal indicating that the absolute value of the difference is equal to or greater than the second threshold value. The adder circuit 37 then adds together the signal K2 and, instead of the signal K1, the amplified low-sensitivity-pixel output signal K4 which includes a small amount of artifacts caused by color mixture to generate and output an image signal K6 (second image signal).

As explained in the above, according to a solid-state image sensor of an example embodiment of the present invention and a signal processing method of the same, if the brightness of light from an object is low, in other words, if a high-sensitivity-pixel output signal K1 does not reach a level of a saturated-high-sensitivity-pixel output signal K0 which is an output signal when the signal K1 is saturated (i.e., if signal charge accumulated in a high sensitivity pixel is not saturated), then a difference value between the signal K1 and an amplified low-sensitivity-pixel output signal K4 is calculated, the signal K4 being obtained by multiplying a low-sensitivity-pixel output signal K2 by a sensitivity ratio. If the absolute value of the difference value is smaller than a given threshold value (second threshold value), it is decided that the amount of artifacts caused by color mixture is small and the signal K1 and the signal K2 are added and output as an image signal K5. The image signal K5 therefore includes only a small amount of artifacts caused by color mixture, and a dynamic range can be ensured by the output of the high sensitivity pixel 11 (the signal K1) even if the brightness of light from an object is low. On the other hand, if the absolute value of the difference value is equal to or greater than the given threshold value (second threshold value), it is decided that the signal K1 includes a large amount of artifacts caused by color mixture. In this case, the amplified low-sensitivity-pixel output signal K4, instead of the signal K1, is added to the signal K2 to generate and output an image signal K6. The image signal K6 therefore includes only a small amount of artifacts, and a dynamic range can be ensured by the amplified output of the low sensitivity pixel 12 (the signal K4) even if the brightness of light from an object is low.

According to the above signal processing method, the output signal is changed based on a given threshold value (second threshold value). In other words, the signal is changed particularly depending on the amount of noise generated by color mixture. In general, visible light having a long wavelength has a long absorption length and is apt to leak into an adjacent pixel to generate color mixture. Thus, according to the above signal processing method, it is possible to reproduce an image with less color mixture even if an adjacent pixel is, for example, one that receives long wavelength light and the brightness of the light is high. Hence, it is possible to ensure a sufficiently-high maximum amount of charge accumulation without increasing the isolation area around a pixel which receives high-brightness light.

On the other hand, if the brightness of light from an object is high, in other words, if a high-sensitivity-pixel output signal K1 reaches the level of a saturated-high-sensitivity-pixel output signal K0 (i.e., if signal charge accumulated in a high sensitivity pixel is saturated), then the signal K0 or a first threshold value is output. A dynamic range can thus be ensured even after the high sensitivity pixel is saturated. Moreover, the use of a constant value as the first threshold value can suppress variations in saturation between pixels as mentioned earlier.

As explained in the above, according to a solid-state image sensor of an example embodiment of the present invention and a signal processing method of the same, it is possible to suppress color mixture and achieve high-quality color reproduction while keeping a wide dynamic range.

(Modification)

A signal processing method of a solid-state image sensor according to a modification of an example embodiment of the present invention is hereinafter described, with reference made to FIG. 4 and FIG. 5.

Figure 4:
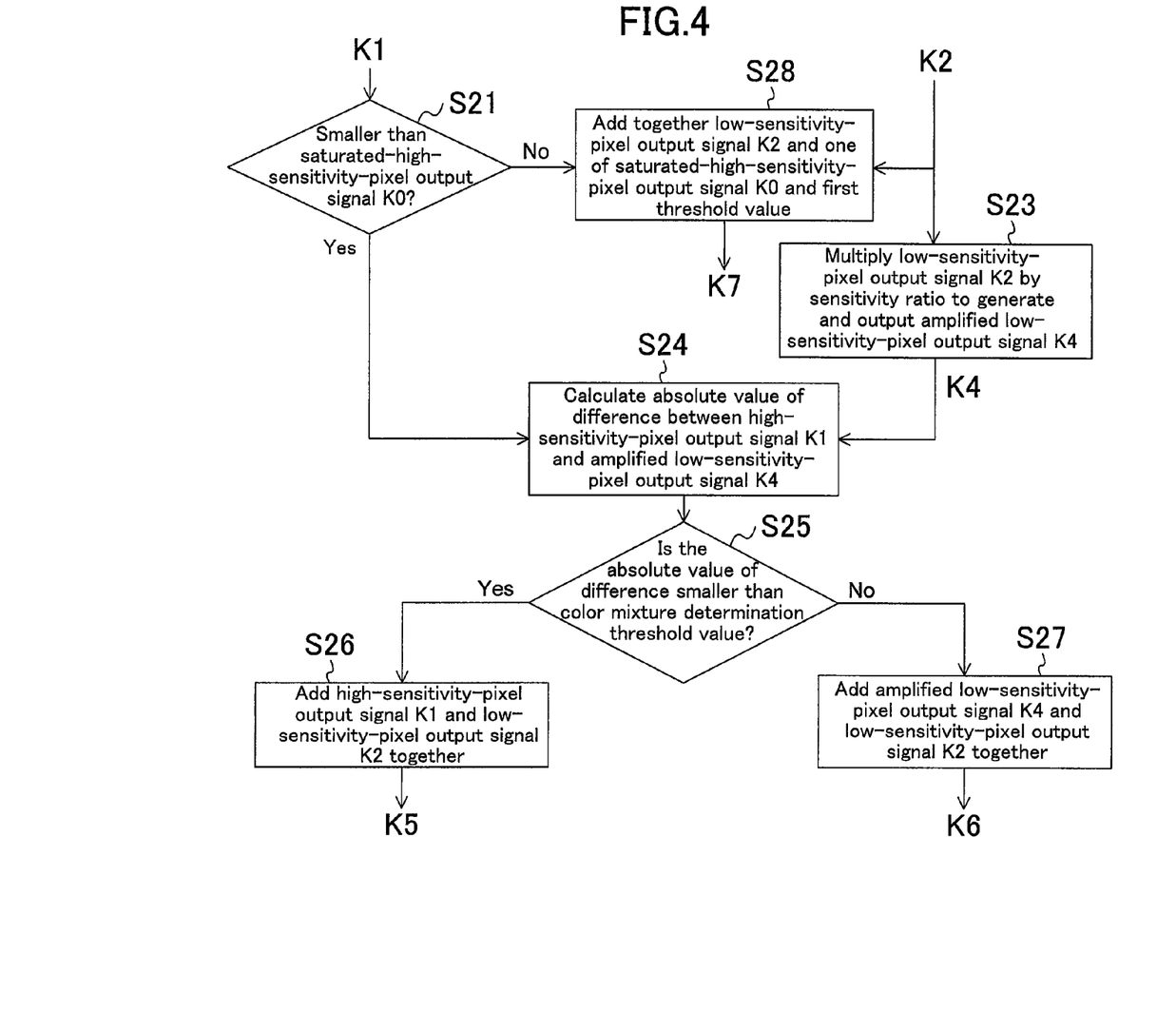
FIG. 4 illustrates a flowchart of a signal processing method of a solid-state image sensor according to a modification of an example embodiment of the present invention.

FIG. 4 illustrates a flowchart of a signal processing method of a solid-state image sensor 10 according to a modification of an example embodiment of the present invention. FIG. 5 illustrates a block diagram showing a circuit configuration of the solid-state image sensor 10 that is necessary for realizing the signal processing method of the example embodiment shown in FIG. 4. Many parts of the flowchart and block diagram shown in FIG. 4 and FIG. 5 and the description thereof are the same as the flowchart and block diagram shown in FIG. 2 and FIG. 3 and the description thereof. The description provided herein is thus focused on the characteristics of the signal processing method according to the present modification. The other parts of the signal processing method according to the present modification are the same as described in the above. The pixel arrangement of the solid-state image sensor 10 according to the present modification and the description thereof are the same as the pixel arrangement of FIG. 1 and the description thereof.

Figure 5:
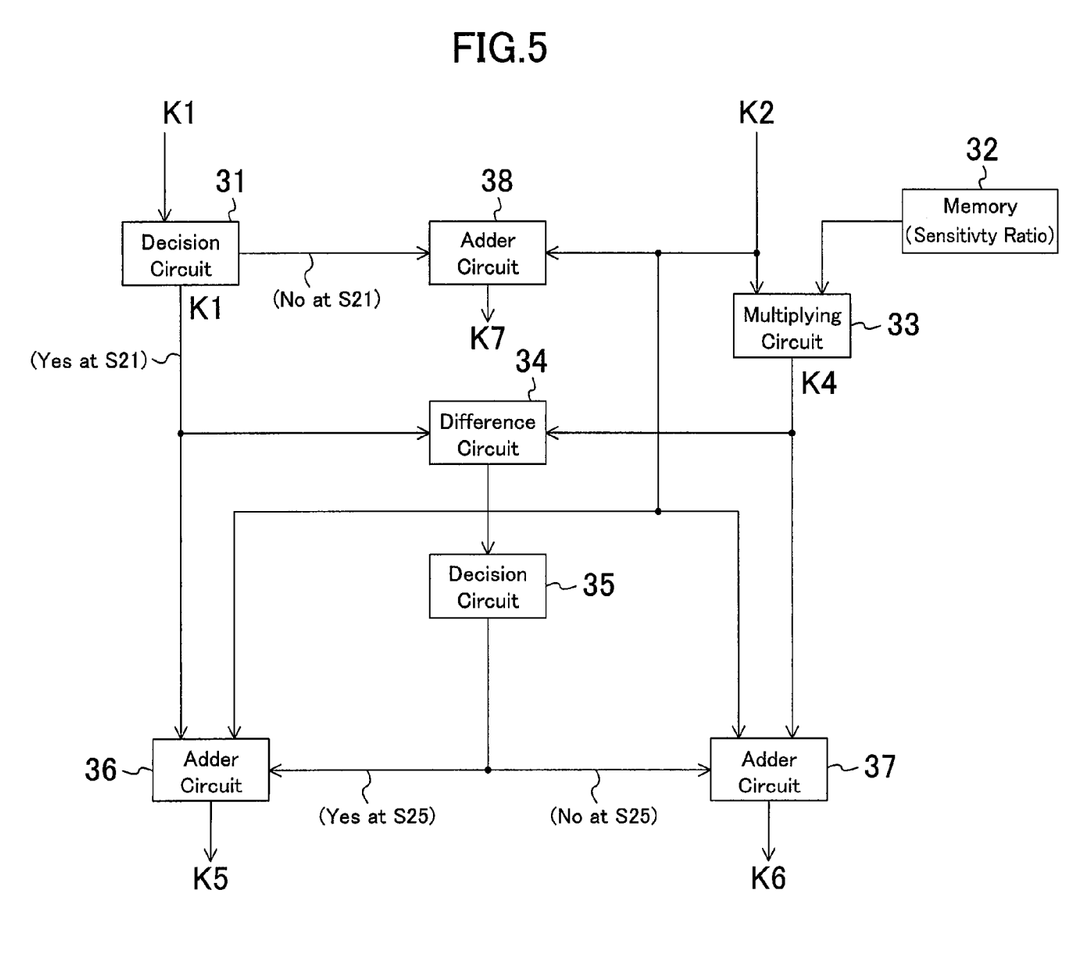
FIG. 5 illustrates a block diagram showing a circuit configuration of signal processing of a solid-state image sensor according to a modification of an example embodiment of the present invention.

According to the signal processing method of the present modification, S21 is followed by S28 if it is decided at S21 that a high-sensitivity-pixel output signal K1 is equal to or greater than a saturated-high-sensitivity-pixel output signal K0 ("No" at S21) as shown in FIG. 4 and FIG. 5. At S28, an adder circuit 38 adds together a low-sensitivity-pixel output signal K2 and one of the signal K0 and a first threshold value to generate and output an image signal K7 (third image signal). This means that the image signal K7 is different from the image signal K3 of FIG. 2 in that the image signal K7 includes the signal K2 output from the low sensitivity pixel 12. Thus, high-brightness light is resolved more precisely by the image signal K7 than by the first threshold value output as the image signal K3 at S22 of FIG. 22.

As mentioned in the above, according to the present modification, image signals from both of a high sensitivity pixel and a low sensitivity pixel are efficiently used not only when the brightness of incoming light is low, but also when the brightness of incoming light is high. It is therefore possible to obtain images with higher quality color reproduction.

An example embodiment of the present invention is useful such as for a signal processing method of digital cameras.

What is claimed is:

1. A signal processing method for a solid-state image sensor in which a high sensitivity pixel whose sensitivity to brightness is high and a low sensitivity pixel whose sensitivity to brightness is low are arranged according to a given pixel pattern and multiple ones of given pixel pattern are arranged in a matrix, and in which each signal charge accumulated in the high sensitivity pixel and the low sensitivity pixel due to light from an object is converted into an electric signal and from which the electric signal is output, the method comprising:

(a) comparing a first threshold value and a high-sensitivity-pixel output signal, which is an electric signal converted from a signal charge accumulated in the high sensitivity pixel, thereby determining whether or not the high-sensitivity-pixel output signal reaches a level of a saturated-high-sensitivity-pixel output signal, which is the high-sensitivity-pixel output signal when the signal charge accumulated in the high sensitivity pixel is saturated;

(b) if the high-sensitivity-pixel output signal does not reach the level of the saturated-high-sensitivity-pixel output signal at (a), calculating a difference value between the high-sensitivity-pixel output signal and an amplified low-sensitivity-pixel output signal obtained by multiplying a low-sensitivity-pixel output signal by a sensitivity ratio, the low-sensitivity-pixel output signal being an electric signal converted from a signal charge accumulated in the low sensitivity pixel, and the sensitivity ratio being obtained by dividing a sensitivity value of the high sensitivity pixel by a sensitivity value of the low sensitivity pixel; and (c) outputting one of a first image signal and a second image signal which are different from each other, according to whether or not an absolute value of the difference value at (b) is smaller than a second threshold value.

2. The signal processing method of claim 1, wherein (c) includes:

if the absolute value of the difference value at (b) is smaller than the second threshold value, adding the high-sensitivity-pixel output signal and the low-sensitivity-pixel output signal together and outputting a resultant signal as the first image signal; and if the absolute value of the difference value at (b) is equal to or greater than the second threshold value, adding the amplified low-sensitivity-pixel output signal and the low-sensitivity-pixel output signal together and outputting a resultant signal as the second image signal.

3. The signal processing method of claim 1, further comprising:

(d) if the high-sensitivity-pixel output signal reaches the level of the saturated-high-sensitivity-pixel output signal at (a), outputting the saturated-high-sensitivity-pixel output signal or the first threshold value as a third image signal.

4. The signal processing method of claim 3, wherein (d) includes adding together the amplified low-sensitivity-pixel output signal and one of the saturated-high-sensitivity-pixel output signal and the first threshold value and outputting a resultant signal as the third image signal.

5. The signal processing method of claim 1, wherein the high sensitivity pixel has a light-receiving surface which is larger than a light-receiving surface of the low sensitivity pixel.

6. The signal processing method of claim 1, wherein
the high and low sensitivity pixels have high and low sensitivities to a first optical wavelength band,
the solid-state image sensor further includes:
a first medium sensitivity pixel having a medium sensitivity between the sensitivity of the high sensitivity pixel and the sensitivity of the low sensitivity pixel to a second optical wavelength band which is different from the first optical wavelength band; and
a second medium sensitivity pixel having a medium sensitivity between the sensitivity of the high sensitivity pixel and the sensitivity of the low sensitivity pixel to a third optical wavelength band which is different from the first optical wavelength band, and
the high sensitivity pixel, the low sensitivity pixel, the first medium sensitivity pixel, and the second medium sensitivity pixel are arranged according to the given pixel pattern and multiple ones of given pixel pattern are arranged in a matrix.

7. The signal processing method of claim 6, wherein the first optical wavelength band includes a wavelength to which the human eye is most sensitive.

8. The signal processing method of claim 7, wherein the first optical wavelength band corresponds to green.

9. The signal processing method of claim 6, wherein one of the second and third optical wavelength bands includes a wavelength or absorption length which is longer than a wavelength or absorption length of the first optical wavelength band.

10. The signal processing method of claim 1, wherein the second threshold value is a multiple value of an amount of random noise in the low sensitivity pixel, the multiple value being larger than 1.

11. A solid-state image sensor in which a high sensitivity pixel whose sensitivity to brightness is high and a low sensitivity pixel whose sensitivity to brightness is low are arranged according to a given pixel pattern and multiple ones of given pixel pattern are arranged in a matrix, and in which each signal charge accumulated in the high sensitivity pixel and the low sensitivity pixel due to light from an object is converted into an electric signal and from which the electric signal is output, comprising:

a first decision circuit for comparing a first threshold value and a high-sensitivity-pixel output signal, which is an electric signal converted from a signal charge accumulated in the high sensitivity pixel, thereby determining whether or not the high-sensitivity-pixel output signal reaches a level of a saturated-high-sensitivity-pixel output signal, which is the high-sensitivity-pixel output signal when the signal charge accumulated in the high sensitivity pixel is saturated;

a difference circuit for calculating, if the first decision circuit determines that the high-sensitivity-pixel output signal does not reach the level of the saturated-high-sensitivity-pixel output signal, a difference value between the high-sensitivity-pixel output signal and an amplified low-sensitivity-pixel output signal obtained by multiplying a low-sensitivity-pixel output signal by a sensitivity ratio, the low-sensitivity-pixel output signal being an electric signal converted from a signal charge accumulated in the low sensitivity pixel, and the sensitivity ratio being obtained by dividing a sensitivity value of the high sensitivity pixel by a sensitivity value of the low sensitivity pixel;

a second decision circuit for determining whether or not an absolute value of the difference value calculated by the difference circuit is smaller than a second threshold value; and an adder circuit for outputting one of a first image signal and a second image signal which are different from each other, according to a decision of the second decision circuit.

12. The solid-state image sensor of claim 11, wherein the adder circuit includes:

a first adder circuit for adding the high-sensitivity-pixel output signal and the low-sensitivity-pixel output signal together and outputting a resultant signal as the first image signal, if the absolute value of the difference value calculated by the difference circuit is smaller than the second threshold value; and a second adder circuit for adding the amplified low-sensitivity-pixel output signal and the low-sensitivity-pixel output signal together and outputting a resultant signal as the second image signal, if the absolute value of the difference value calculated by the difference circuit is equal to or greater than the second threshold value.

* * * * *